(12) United States Patent
Lendenmann et al.

(10) Patent No.: US 8,749,109 B2
(45) Date of Patent: Jun. 10, 2014

(54) ROTOR DISK WITH SPOKE OPENINGS

(71) Applicants: Heinz Lendenmann, Vasteras (SE); Bertil Larsson, Vasteras (SE); Jonas Larsson, Vasteras (SE); Par Ingelstrom, Molndal (SE); Gustav Borg, Vasteras (SE)

(72) Inventors: Heinz Lendenmann, Vasteras (SE); Bertil Larsson, Vasteras (SE); Jonas Larsson, Vasteras (SE); Par Ingelstrom, Molndal (SE); Gustav Borg, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/732,551

(22) Filed: Jan. 2, 2013

(65) Prior Publication Data
US 2013/0119819 A1  May 16, 2013

Related U.S. Application Data

(63) Continuation of application No. PCT/EP2010/059481, filed on Jul. 2, 2010.

(51) Int. Cl.
H02K 1/24 (2006.01)
H02K 19/02 (2006.01)

(52) U.S. Cl.
USPC ............. 310/216.106; 310/162; 310/216.107

(58) Field of Classification Search
USPC .......... 310/168, 211, 216.106–216.107, 162, 310/216.108–216.109
See application file for complete search history.

(56) References Cited

U.S. PATENT DOCUMENTS

| 2,733,362 | A |   | 1/1956  | Bauer et al. |
| 2,913,607 | A | * | 11/1959 | Douglas et al. ........ 310/216.107 |
| 2,975,310 | A | * | 3/1961  | Armstrong et al. ........... 310/163 |
| 3,047,755 | A |   | 7/1962  | Angst et al. |
| 3,210,584 | A | * | 10/1965 | Jorgensen et al. ............ 310/265 |
| 3,721,844 | A | * | 3/1973  | Fong ............................. 310/166 |
| 6,300,703 | B1 |  | 10/2001 | Kawano et al. |
| 7,560,846 | B2 |  | 7/2009  | Lee et al. |
| 2007/0170803 | A1 | | 7/2007 | Yabe et al. |

FOREIGN PATENT DOCUMENTS

| JP | 2001136717 A | 5/2001 |
| JP | 2004254354 A | 9/2004 |
| JP | 2006042467 A | 2/2006 |

OTHER PUBLICATIONS

International Search Report & Written Opinion of the International Searching Authority Application No. PCT/EP2010/059481 Completed: Mar. 17, 2011; Mailing Date: Mar. 25, 2011 11 pages.
Written Opinion of the International Preliminary Examining Authority Application No. PCT/EP2010/059481 Mailing Date: Jul. 13, 2012 7 pages.

* cited by examiner

Primary Examiner — Tran Nguyen
(74) Attorney, Agent, or Firm — St. Onge Steward Johnston & Reens LLC

(57) ABSTRACT

A rotor disk for a rotor of a synchronous reluctance machine consists of a disk body material with high magnetic permeability. In order to improve the ability of the rotor disk to stand centrifugal and thermal loads, spokes extending in radial direction between a shaft opening and a disk periphery are provided with spoke openings. These openings extend over a wide distance both in circumferential direction and in radial direction to worsen the heat conducting properties of the spokes and to render the spokes less stiff.

15 Claims, 2 Drawing Sheets

ROTOR DISK WITH SPOKE OPENINGS

FIELD OF THE INVENTION

The present invention relates to a rotor disk for rotor of a synchronous reluctance machine. The heat conduction properties and stiffness of the rotor disk have been modified by providing openings in radial extending spokes to thereby improve the ability of the rotor disk to stand centrifugal and thermal loads.

BACKGROUND OF THE INVENTION

Referring to FIG. 1, a typical rotor 100 of a synchronous reluctance machine consists of a plurality of rotor disks 110 stacked together in axial direction. Each rotor disk 110 comprises essentially a disk body of high magnetic permeability material, and longitudinal flux barriers 120 of low magnetic permeability material. Typically the flux barriers 120 are created by cutting material from the disk body, the low magnetic permeability material thereby being air. The flux barriers 120 are configured to give the rotor disk 110 an anisotropic magnetic structure such that axes of maximum reluctance i.e. q-axes 130, and axes of minimum reluctance i.e. d-axes 140 are formed. Each pole of the rotor disk 110 typically comprises 3-5 radial distanced longitudinal flux barriers 120 in turns with flux paths 150 of corresponding shape. A radial extending symmetry line of each pole coincides with a q-axis 130. The rotor disk 110 is mechanically self-sustained in that the flux paths 150 are connected to one another by narrow tangential ribs 160 at a disk periphery 170, and eventually also with radial bridges 180 at q-axes 130.

Between neighbouring rotor poles there are spokes 190 extending in radial direction between a shaft opening 200 and the disk periphery 170. Typically, if the spokes 190 are symmetrical, the symmetry axis of each spoke 190 coincides with a d-axis 140. The spokes 190 are typically solid elements consisting of the disk body material, but they may comprise some holes or openings in different shapes and for different purposes such as for inserting tie bolts or for functioning as a flux barrier 120.

JP 2004-254354 discloses a rotor disk with triangle-shaped openings in the spokes. These openings function as flux barriers.

JP 2006-042467 discloses a rotor disk with wide openings in the spokes. The function of the openings is to affect the rigidity of the rotor disc such that it can better stand deformations due to the centrifugal force.

JP 2001-136717 discloses a rotor disk with relatively large openings in the spokes. JP2001-136717 does not explain the purpose of the openings, but the explanation is probably related to the mechanical properties of the rotor disk. The width of the openings at the radial inward ends of the same is only slightly greater than the overall width of the openings.

U.S. Pat. No. 7,560,846 discloses in FIG. 13 a rotor disk comprising triangular shaped openings in the spokes. The openings are configured to receive a coupling member fixing and orienting the rotor disks together.

U.S. Pat. No. 6,300,703 discloses in FIG. 31 a rotor disk with a long and narrow opening in the spokes. U.S. Pat. No. 6,300,703 does not explain the purpose of the openings, but they appear to function as additional flux barriers.

When a synchronous reluctance machine operates, iron losses in the rotor 100 cause the rotor 100 to heat up. Although such losses are relatively low in a synchronous reluctance machine, the temperature at the flux paths 150 separated by flux barriers 120 still may become quite high because the generated heat cannot be effectively conducted away. It is only the radial innermost flux paths 150, i.e. the spokes 190, that have a large heat conducting area towards the rotor shaft. All the remaining flux paths 150 are connected to the rotor shaft only via narrow ribs 160 or bridges 180 which do not provide an adequate heat conducting capacity for keeping the rotor temperatures down. Therefore, in a conventional synchronous reluctance machine there is a great temperature difference between the spokes 190 and the remaining flux paths 150 during a long-term operation.

Great temperature differences between different parts of a rotor disk 110 cause thermal tensions within the same. Together with centrifugal load these tensions result in an excess deformation of the rotor disk 110 which lead to hairline cracks and ultimately destroy the rotor disk 110. The prior art rotor disks 110 do not provide a satisfactory solution for preventing this from happening. FIG. 2 shows a simulated detail of a conventional rotor disk 110 in a deformed state under a certain load condition. The deformations in FIG. 2 are exaggerated for the sake of illustration.

SUMMARY OF THE INVENTION

An object of the present invention is to provide a rotor disk with an improved ability to stand centrifugal and thermal loads, and to provide a corresponding synchronous reluctance machine.

These objects are achieved by the present teachings.

The invention is based on the realization that by providing rotor disk spokes with openings, and to thereby worsening heat conducting properties of the spokes, tensions caused by temperature differences within the rotor disk are reduced. At the same time the spokes become less stiff and allow greater deformation of the rotor disk without permanent damage to the disk body material. Even if some prior art rotor disks comprise spokes with openings, the dimensions of such openings are too small for remarkably altering the heat conduction properties or stiffness of the spokes.

According to a first aspect of the invention, there is provided a rotor disk for a rotor of a synchronous reluctance machine. The rotor disk comprises a disk body material with high magnetic permeability, a plurality of longitudinal flux barriers comprising a material with low magnetic permeability and configured to give the rotor disk an anisotropic magnetic structure such that at least one axis of maximum reluctance i.e. a q-axis, and at least one axis of minimum reluctance i.e. a d-axis are formed, a spoke extending in radial direction between a shaft opening and a disk periphery, and in circumferential direction between two adjacent q-axes, the spoke having a spoke area substantially contoured by the shaft opening, the two adjacent q-axes, two adjacent flux barriers at opposite sides of a d-axis, and the disk periphery. Part of the spoke area is not occupied by the disk body material, the spoke area portion or portions not occupied by the disk body material being distributed in circumferential direction over an angular distance α of at least 25° measured from the rotor disk centre.

By not occupying the whole spoke area with the disk body material, and by distributing the non-occupied portion in circumferential direction over a wide angular distance, temperature differences within the rotor disk are effectively reduced and greater deformation of the same is allowed without permanent damage to the disk body material.

According to one embodiment of the invention, the spoke area portion or portions not occupied by the disk body material are distributed in circumferential direction over an angular distance α of at least 27°, such as 30°, 33° or 35°. Even more even temperature distribution is achieved and even greater deformations allowed when the non-occupied portion is increased in circumferential direction.

According to one embodiment of the invention, the spoke area portion or portions not occupied by the disk body material are distributed in circumferential direction over an angular distance α corresponding to at least 38%, such as 40%, 45% or 50%, of the angular distance between two adjacent q-axes. Depending on the pole number of the rotor it may be reasonable to express the distribution of the non-occupied portion in circumferential direction in terms of a value relative to the pole sector instead of an absolute value.

According to one embodiment of the invention, the spoke area portion or portions not occupied by the disk body material are distributed in radial direction over a distance d corresponding to at least 50%, such as 60%, 70% or 80%, of the maximum distance D between the shaft opening and the disk periphery. By distributing the non-occupied portion over a long distance in radial direction, temperature differences within the rotor disk are further reduced and even greater deformation of the same is allowed without permanent damage to the disk body material.

According to one embodiment of the invention, the spoke area comprises a continuous portion not occupied by the disk body material, the continuous portion extending in circumferential direction over an angular distance α of at least 25°, such as 27°, 30°, 33° or 35° or, alternatively, the continuous portion extending in circumferential direction over an angular distance α corresponding to at least 38%, such as 40%, 45% or 50%, of the angular distance between two adjacent q-axes or, alternatively, the continuous portion extending in radial direction over a distance d corresponding to at least 50%, such as 60%, 70% or 80%, of the maximum radial distance D between the shaft opening and the disk periphery or, alternatively, the angular distance α over which the continuous portion extends in circumferential direction being at least four times, such as five, seven or ten times, the angular dimension β of the continuous portion in the middle of the same in radial direction. By making the non-occupied portion continuous, temperature differences within the rotor disk are further reduced and even greater deformation of the same is allowed without permanent damage to the disk body material.

According to one embodiment of the invention, less than 75%, such as less than 70% or less than 65%, of the spoke area is occupied by the disk body material. Less disk body material leads to further decreased heat conduction and to even less stiff spokes.

According to one embodiment of the invention, a radial outermost part of the spoke area portion or portions not occupied by the disk body material has a rounding in shape of an arc of a circle extending over 200° such as over 220°. With such a rounding shape mechanical stresses about this portion are distributed evenly and stress concentration points are prevented.

According to one embodiment of the invention, the spoke has a cut-out at the disk periphery. A narrow cut-out at the disk periphery further improves the flexibility of the spoke at the radial outermost portion of the same.

According to one embodiment of the invention, the spoke area portion or portions not occupied by the disk body material is filled with air. Cutting out disk body material is a simple way of providing the non-occupied portions and leads to air-filled spoke openings.

According to one embodiment of the invention, the spoke area does not comprise but a single continuous portion not occupied by the disk body material. Manufacturing of one continuous portion appears simpler than manufacturing of a plurality of portions.

According to one embodiment of the invention, the shaft opening comprises a key hole on a q-axis. By directing the key holes towards q-axes the heat conduction path between two adjacent spokes is divided into two narrow necks which further decreases the heat conduction area towards the shaft.

According to a second aspect of the invention, there is provided a synchronous reluctance machine comprising a rotor disk according to the description hereinbefore.

BRIEF DESCRIPTION OF THE DRAWINGS

The invention will be explained in greater detail with reference to the accompanying drawings, wherein.

DETAILED DESCRIPTION OF THE INVENTION

Figure 1:
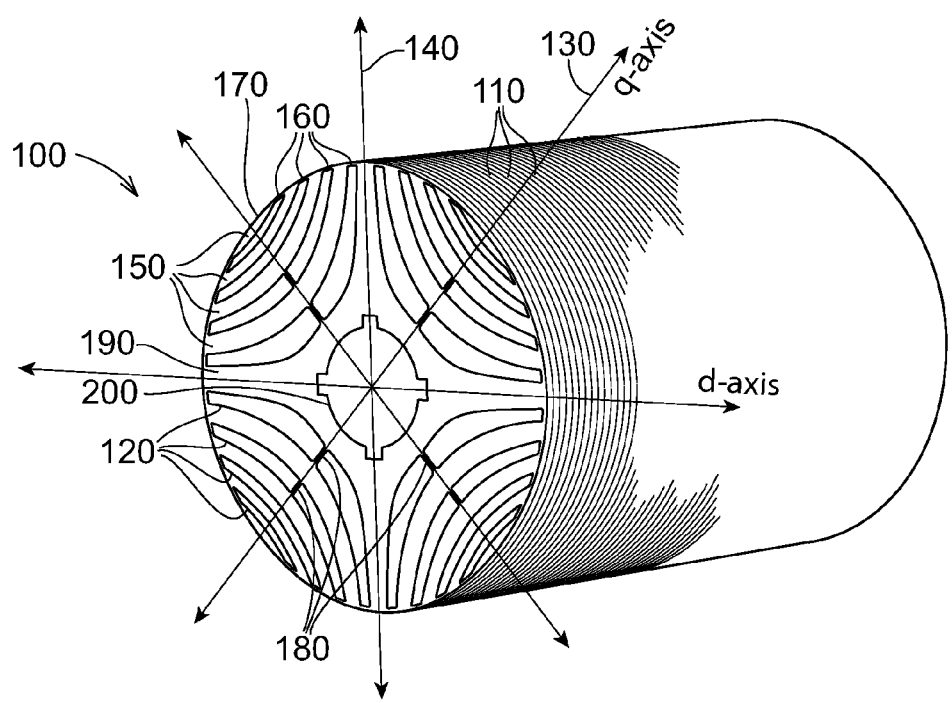
FIG. 1 shows a conventional rotor of a synchronous reluctance machine.
Figure 2:
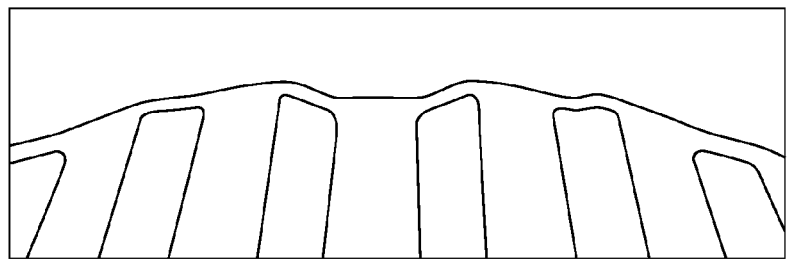
FIG. 2 shows a simulated detail of a conventional rotor disk in a deformed state under different loads.
Figure 3:
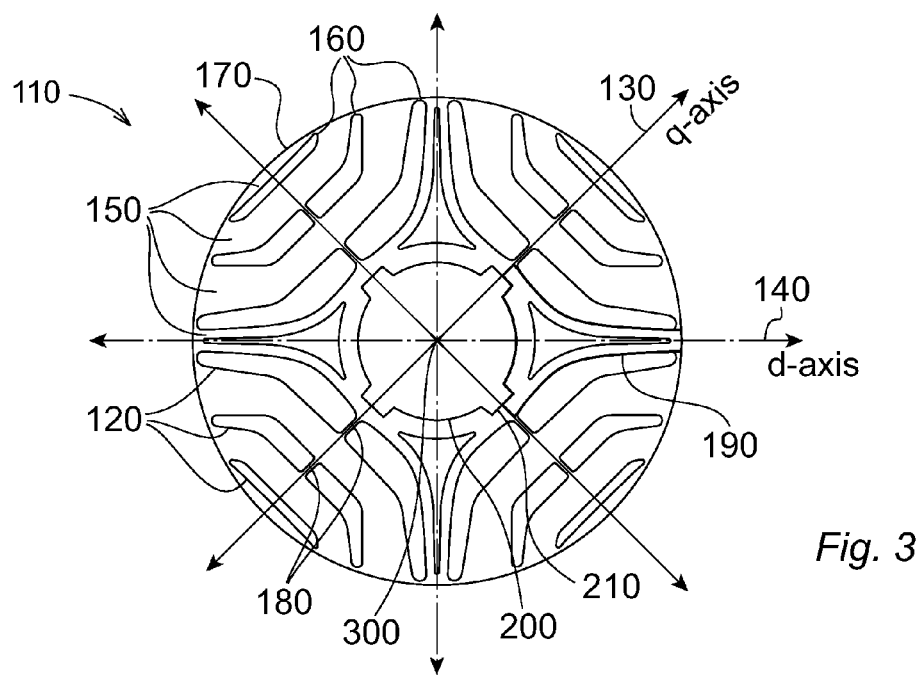
FIG. 3 shows a rotor disk according to one embodiment of the invention.

Referring to FIG. 3, a rotor disk 110 with four poles is shown. The rotor disk 110 is symmetrical, each pole comprising four flux paths 150 separated by three flux barriers 120. The flux paths 150 are connected to one another by narrow tangential ribs 160 at the disk periphery 170, and some of them are additionally connected with radial bridges 180 crossing the flux barriers 120 in the middle. The disk periphery 170 may have a circular shape, but the shape can also be slightly non-circular and/or it may comprise recesses or cutouts. About the rotor disk centre 300 there is a shaft opening 200 with four key holes 210. A rotor shaft (not shown) is inserted into the shaft opening 200 in a complete rotor 100. The disk body is made of electrical steel, and the flux barriers 120 consist of air-filled openings formed by cutting out the disk body material. Each pole has an axis of maximum reluctance i.e. a q-axis 130 which coincides with a radial extending symmetry axis of each pole. Between each pair of adjacent poles there is an axis of minimum reluctance i.e. a d-axis 140.

At each d-axis 140 there is a spoke 190 extending in radial direction between the shaft opening 200 and the disk periphery 170. In circumferential direction the spokes 190 extend between two adjacent q-axes 130. Each spoke 190 thereby has a spoke area contoured by (or defined by) the shaft opening 200 (including two key holes 210), two adjacent q-axes 130, two adjacent flux barriers 120 at opposite sides of a d-axis 140, and the disk periphery 170. When defining the contours of the spoke areas, the tangential ribs 160 at the disk periphery 170 should be omitted as well as any rounding or chamfering of the flux barrier shape close to the disk periphery 170. Also any bridges 180 crossing the flux barriers 120 should be omitted. Instead, the contours should be considered to follow the flux barrier edges and natural extensions of the same when considering the overall shape of the whole flux barriers 120.

Figure 4A:
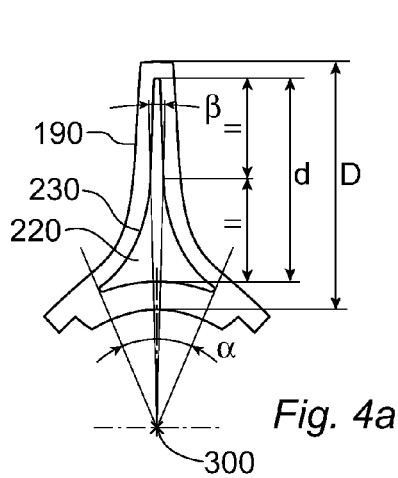
FIGS. 4a-4f show preferred embodiments of spokes for rotor disks according to the invention.
Figure 4B:
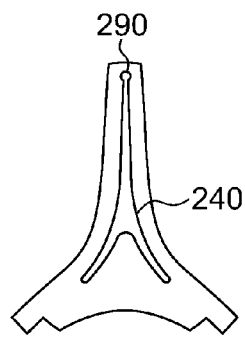
Figure 4C:
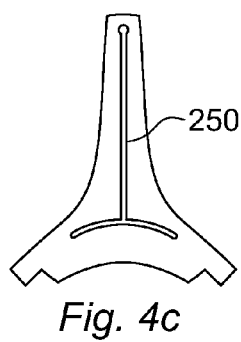
Figure 4D:
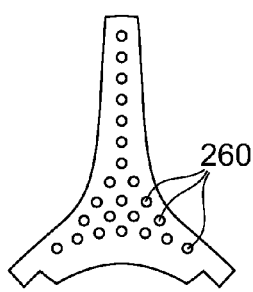
Figure 4E:
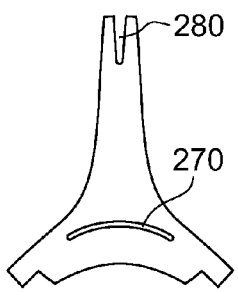
Figure 4F:
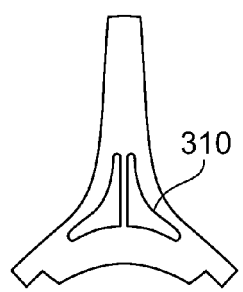

Some preferred embodiments of spokes 190 for rotor disks 110 according to the invention are shown in FIGS. 4a-4f. The spoke areas are not completely occupied by the disk body material but they are provided with spoke openings 220 in different shapes. FIGS. 4a-4c show three different spokes 190, each with a single continuous spoke opening 220 in shapes of a funnel 230, the Eiffel Tower 240 and a letter T 250, respectively. FIG. 4d shows a spoke 190 with a plurality of round openings 260 together forming a shape of a funnel. FIG. 4e shows a spoke 190 with an arc-shaped narrow opening 270 close to the shaft opening 200, and with a narrow cut-out 280 at the disk periphery 170. Finally, FIG. 4e shows a spoke 190 with two symmetrical openings 310.

The spoke openings 220 cause the heat conduction path between the radial outermost parts of the spokes 190 and the rotor shaft to increase in length and to decrease in cross section compared with solid spokes 190. The heat conducting properties of the spokes 190 are thereby worsened, and as a result the radial outermost parts of the spokes 190 become warmer during operation of the machine. This brings the spoke temperature closer to the already high temperature of the remaining flux paths 150, and tensions caused by temperature differences within the rotor disk 110 are reduced. It is to be noted that in contrast to induction machines (increased copper losses) and permanent magnet machines (weakened magnetic field), the increased rotor temperature does not have any negative effect on performance in a synchronous reluctance machine.

The spoke openings 220 also render the spokes 190 less stiff and allow greater deformation of the same without permanent damage to the rotor disk material. This has significance when centrifugal forces in a rotating rotor 100 tend to deform the rotor disks 110 by drawing the flux paths 150 outwards. The radial outermost parts of the spoke openings 220 may be provided with a rounding 290 in a shape of an arc of an almost full circle according to FIGS. 4b and 4c. Such a rounding 290 distributes mechanical stresses about this portion evenly over the whole length of the rounding 290 and prevents stress concentration points from occurring. The narrow cut-out 280 at the disk periphery 170 according to FIG. 4e further improves the flexibility of the spoke 190 at the radial outermost portion of the same.

Looking closer at the spoke 190 of FIG. 4a, the spoke opening 220 extends in circumferential direction over an angular distance α of about 45° measured from the rotor disk centre 300. This corresponds to about 50% of the angular distance (90°) between two adjacent q-axes 130. In radial direction the spoke opening 220 extends over a distance d corresponding to about 82% of the maximum distance D between the shaft opening 200 and the disk periphery 170. The angular distance α (45°) over which the spoke opening 220 extends in circumferential direction is about 16 times the angular dimension β (2,85°) of the spoke opening 220 in the middle of the same in radial direction. Only about 63% of the spoke area is occupied by the disk body material while the rest is occupied by the spoke opening 220.

The key holes 210 are directed towards q-axes 130 in order to divide the heat conduction path between two adjacent spokes 190 into two narrow necks instead of one broader one. Such a division further improves the mechanical and thermal properties of the spokes 190.

The invention is not limited to the embodiments shown above, but the person skilled in the art may, of course, modify them in a plurality of ways within the scope of the invention as defined by the claims. Thus, for example, the invention is not limited to rotor disks 110 with spoke openings 220 filled with air but the spoke openings 220 may be filled with any thermally isolating material. Also, the pole number of the rotor is not limited to four, but the pole number may be two, six, eight, or even greater. Finally, the invention is not limited to machines using solely reluctance component for creating torque. Indeed, such machine may additionally comprise other means, for example permanents magnets, for creating torque.

What is claimed is:

1. A rotor disk for a rotor of a synchronous reluctance machine, the rotor disk comprising:
   a disk body material with high magnetic permeability;
   a plurality of longitudinal flux barriers comprising a material with low magnetic permeability and configured to give the rotor disk an anisotropic magnetic structure such that at least one axis of maximum reluctance (q-axis) and at least one axis of minimum reluctance (d-axis) are formed;
   a spoke extending in radial direction between a shaft opening and a disk periphery, and in circumferential direction between two adjacent q-axes, the spoke having a spoke area substantially contoured by the shaft opening, the two adjacent q-axes, two adjacent flux barriers at opposite sides of a d-axis, and the disk periphery;
   wherein at least one portion of the spoke area is not occupied by the disk body material, the at least one spoke area portion not occupied by the disk body material being distributed in circumferential direction over an angular distance of at least 25° measured from the rotor disk centre;
   wherein that the at least one spoke area portion not occupied by the disk body material is distributed in radial direction over a distance corresponding to at least 60% of the maximum distance between the shaft opening and the disk periphery.

2. The rotor disk according to claim 1, wherein the at least one spoke area portion not occupied by the disk body material is distributed in circumferential direction over an angular distance of at least 27°.

3. The rotor disk according to claim 1, wherein the at least one spoke area portion not occupied by the disk body material is distributed in circumferential direction over an angular distance corresponding to at least 38% of the angular distance between two adjacent q-axes.

4. The rotor disk according to claim 1, wherein the at least one spoke area portion not occupied by the disk body material is distributed in radial direction over a distance corresponding to at least 70% of the maximum distance between the shaft opening and the disk periphery.

5. The rotor disk according to claim 1, wherein the spoke area comprises a continuous portion not occupied by the disk body material, the continuous portion extending in circumferential direction over an angular distance of at least 25°.

6. The rotor disk according to claim 1, wherein the spoke area comprises a continuous portion not occupied by the disk body material, the continuous portion extending in circumferential direction over an angular distance corresponding to at least 38% of the angular distance between two adjacent q-axes.

7. The rotor disk according to claim 1, wherein the spoke area comprises a continuous portion not occupied by the disk body material, the continuous portion extending in radial direction over a distance corresponding to at least 50% of the maximum radial distance between the shaft opening and the disk periphery.

8. The rotor disk according to claim 1, wherein the spoke area comprises a continuous portion not occupied by the disk body material, the angular distance over which the continuous portion extends in circumferential direction being at least four times the angular dimension of the continuous portion in the middle of the same in radial direction.

9. The rotor disk according to claim 1, wherein less than 75% of the spoke area is occupied by the disk body material.

10. The rotor disk according to claim 1, wherein a radial outermost part of the at least one spoke area portion not occupied by the disk body material has a rounding in shape of an arc of a circle extending over 200°.

11. The rotor disk according to claim 1, wherein the spoke has a cut-out at the disk periphery.

12. The rotor disk according to claim 1, wherein the at least one spoke area portion not occupied by the disk body material is filled with air.

13. The rotor disk according to claim 1, wherein the spoke area comprises a single continuous portion not occupied by the disk body material.

14. The rotor disk according to claim 1, wherein the shaft opening comprises a key hole on a q-axis.

15. A synchronous reluctance machine comprising a rotor disk according to claim 1.

* * * * *